US006985284B2

(12) United States Patent
Denkin et al.

(10) Patent No.: US 6,985,284 B2
(45) Date of Patent: Jan. 10, 2006

(54) METHOD, APPARATUS AND SYSTEM FOR CONTROLLING POWER TRANSIENTS IN A RAMAN-AMPLIFIED OPTICAL TRANSMISSION SYSTEM

(75) Inventors: Nathan Myron Denkin, Aberdeen, NJ (US); Gerard Lingner, III, Long Branch, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 466 days.

(21) Appl. No.: 10/293,754

(22) Filed: Nov. 12, 2002

(65) Prior Publication Data

US 2004/0091205 A1    May 13, 2004

(51) Int. Cl.
*H01S 3/00* (2006.01)
(52) U.S. Cl. ............... 359/334; 359/337.5; 359/341.43
(58) Field of Classification Search ................ 359/334, 359/337.5, 341.4, 341.43
See application file for complete search history.

(56) References Cited

U.S. PATENT DOCUMENTS

| 6,441,950 | B1 * | 8/2002 | Chen et al. ................. 359/334 |
| 6,476,961 | B1 * | 11/2002 | Ye et al. ................. 359/341.43 |
| 6,529,315 | B2 * | 3/2003 | Bartolini et al. ............ 359/334 |
| 6,542,287 | B1 * | 4/2003 | Ye et al. ..................... 359/334 |
| 2002/0114066 | A1 | 8/2002 | Nakaji | |

OTHER PUBLICATIONS

Copy of EPO Search Report published Oct. 13, 2004 for corresponding European Patent Application, EP 1 467 506 A1.

* cited by examiner

*Primary Examiner*—Mark Hellner

(57) ABSTRACT

A method, apparatus and system for controlling power transients in a Raman-amplified optical transmission system includes, in response to the detection of a power transient in an optical signal, varying the gain of at least one dispersion compensating module (DCM) in the Raman-amplified optical transmission system to correct for a change in signal power caused by the power transient.

19 Claims, 5 Drawing Sheets

500

METHOD, APPARATUS AND SYSTEM FOR CONTROLLING POWER TRANSIENTS IN A RAMAN-AMPLIFIED OPTICAL TRANSMISSION SYSTEM

FIELD OF THE INVENTION

This invention relates to the field of optical communication systems and, more specifically, to Raman-amplified optical transmission systems with transient control capabilities.

BACKGROUND OF THE INVENTION

In optical networks, multiple wavelengths of light are used to support multiple communications channels on a single fiber. Optical amplifier spans are used in such networks to amplify optical signals that have been subject to attenuation over multi-kilometer fiber-optic links. A typical amplifier span may include erbium-doped fiber amplifier components that are pumped with diode lasers. Amplifiers have also been studied that use diode-laser pumping to generate gain through stimulated Raman scattering. Optical amplifiers based on erbium-doped fibers and Raman pumping increase the strength of the optical signals being transmitted over the fiber-optic links.

Sometimes channels in a communications link may be abruptly added or dropped. Channels may be dropped due to an accidental fiber cut. Channels may also be added or dropped suddenly due to a network reconfiguration. When the number of channels carried by a transmission fiber span changes abruptly, the total signal power being transported over the span also changes suddenly. If a Raman amplifier span is pumped at a constant power, these sudden changes in signal power will result in transient effects in the gain of the Raman amplifier. Gain transients cause fluctuations in the power of the output signals from the amplifier. Output signals that are too weak may be difficult to detect without errors. Output signals that are too strong may give rise to nonlinear optical effects in fiber.

SUMMARY OF THE INVENTION

The invention comprises a method, apparatus and system for correcting for the effects of power transients due to the loss or addition of a channel(s) in a Raman-amplified optical transmission system.

In one embodiment of the present invention, a method includes in response to the detection of a power transient in an optical signal in a Raman-amplified optical transmission system, varying the gain of at least one dispersion compensating module (DCM) in the Raman-amplified optical transmission system to correct for a change in signal power due to the detected power transient.

In an alternate embodiment of the present invention where a Raman-amplified optical transmission system includes a plurality of optical spans, each optical span including at least one dispersion compensating module (DCM), a method includes in response to the detection of a power transient in an optical span, the gain of a respective at least one DCM in the optical span is varied to correct for a change in signal power in the optical span where a power transient is detected.

In another embodiment of the present invention, an apparatus includes a memory for storing program instructions and a processor for executing the instructions to configure the apparatus to perform the step of in response to the detection of a power transient in an optical signal in a Raman-amplified optical transmission system, varying a gain of at least one dispersion compensating module (DCM) to correct for a change in signal power due to the detected power transient.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention advantageously provides a method and system for controlling the negative effects of power transients in a Raman-amplified optical transmission system. Although an embodiment of the present invention will be described within the context of a Raman-amplified optical transmission system comprising specific components, it will be appreciated by those skilled in the art that the method of the present invention can be advantageously implemented in various other Raman-amplified optical transmission systems wherein it is desirable to control the negative effects of power transients.

Figure 1:
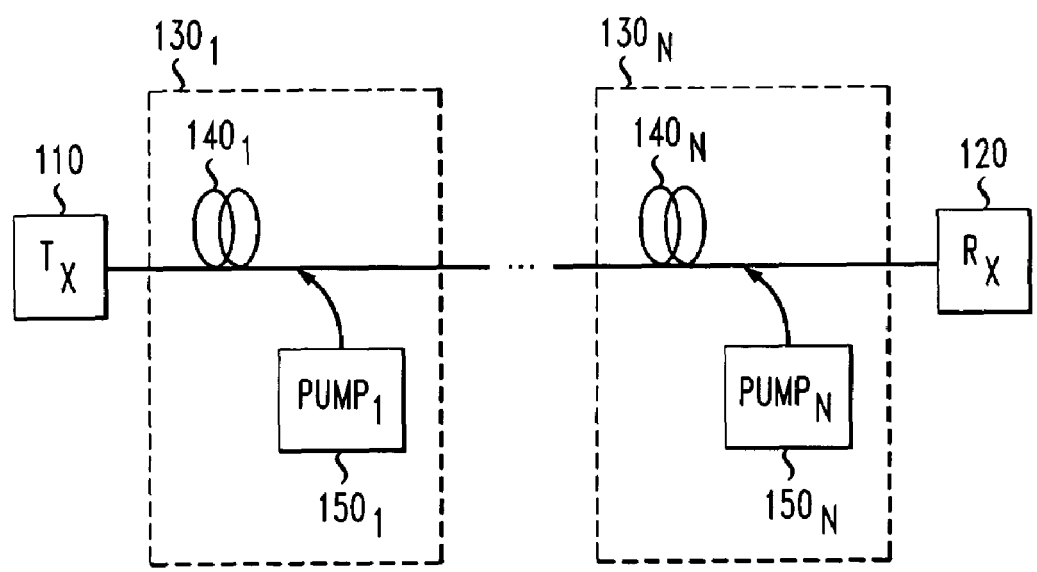
FIG. 1 depicts a high-level block diagram of a conventional Raman-amplified optical transmission system.

FIG. 1 depicts a high-level block diagram of a conventional Raman-amplified optical transmission system. The Raman-amplified optical transmission system 100 of FIG. 1 comprises a transmitter 110, a receiver 120, and a plurality of Raman amplifier spans $130_1$–$130_N$ (collectively Raman amplifier spans 130). Each of the Raman amplifier spans 130 comprises a respective amplification fiber span $140_1$–$140_N$ (collectively fiber spans 140, illustratively standard transmission fiber spans) and a respective pump $150_1$–$150_N$ (collectively pumps 150, illustratively Raman pumps). Each Raman pump 150 may be either a single pump or a plurality of pumps with varied wavelengths acting collectively. The transmitter 110 transmits information to the receiver 120 over the series of Raman amplifier spans 130. Pump light from each of the Raman pumps 150 is transmitted in the backwards direction to pump its respective fiber span 140. Signals in the fiber spans 140 are therefore amplified by Raman gain. Although the amplification fiber spans 140 in the Raman-amplified optical transmission system 100 of FIG. 1 are depicted as comprising standard transmission fibers, it will be appreciated by those skilled in the art that the amplification fiber spans 140 can comprise other amplification mediums such as erbium-doped fiber amplifiers, and the like.

The transmitter 110 may include laser diodes that each supports a channel operating at a different wavelength. As such, if one or more of these lasers is taken out of service or if new channels are added at the transmitter 110, the total number of wavelengths being transmitted across the Raman-amplified optical transmission system 100 may change abruptly. The total number of channels in an optical transmission system may also change due to unexpected system failures such as fiber cuts, or when channels are added or dropped during system reconfigurations using add/drop terminals.

When the total number of channels in the Raman-amplified optical transmission system 100 changes abruptly but the powers of the Raman pumps 150 remains the same, the Raman gain in the fiber spans 140 will also change. Abrupt power changes of this sort may cause unacceptable transients in the power of individual signal channels at the output of each Raman amplifier span 130. For example, if wavelengths (channels) are lost, the input power suddenly decreases because channels have been dropped. If the power of the Raman pumps 150 remains the same, there will be excess gain in each of the pumped fiber spans 140 and the output power per channel at the end of each of the Raman-amplifier spans 130 increases more than desired.

Conversely, when the input power suddenly increases due to the addition of new channels, the Raman pump is depleted more rapidly, which causes the output power per channel at the end of the pumped transmission fiber to decrease more than desired. Because these errors accumulate from Raman amplifier span to Raman amplifier span, the total error of the power for each channel can be calculated by equation (1), which follows:

$$E_t = \sum_{i=1}^{N} E_i \tag{1}$$

wherein $E_i$ represents the error in each amplification span, N stands for the total number of amplification spans, and $E_t$ is the total accumulated error for all of the amplification spans combined.

Figure 2:
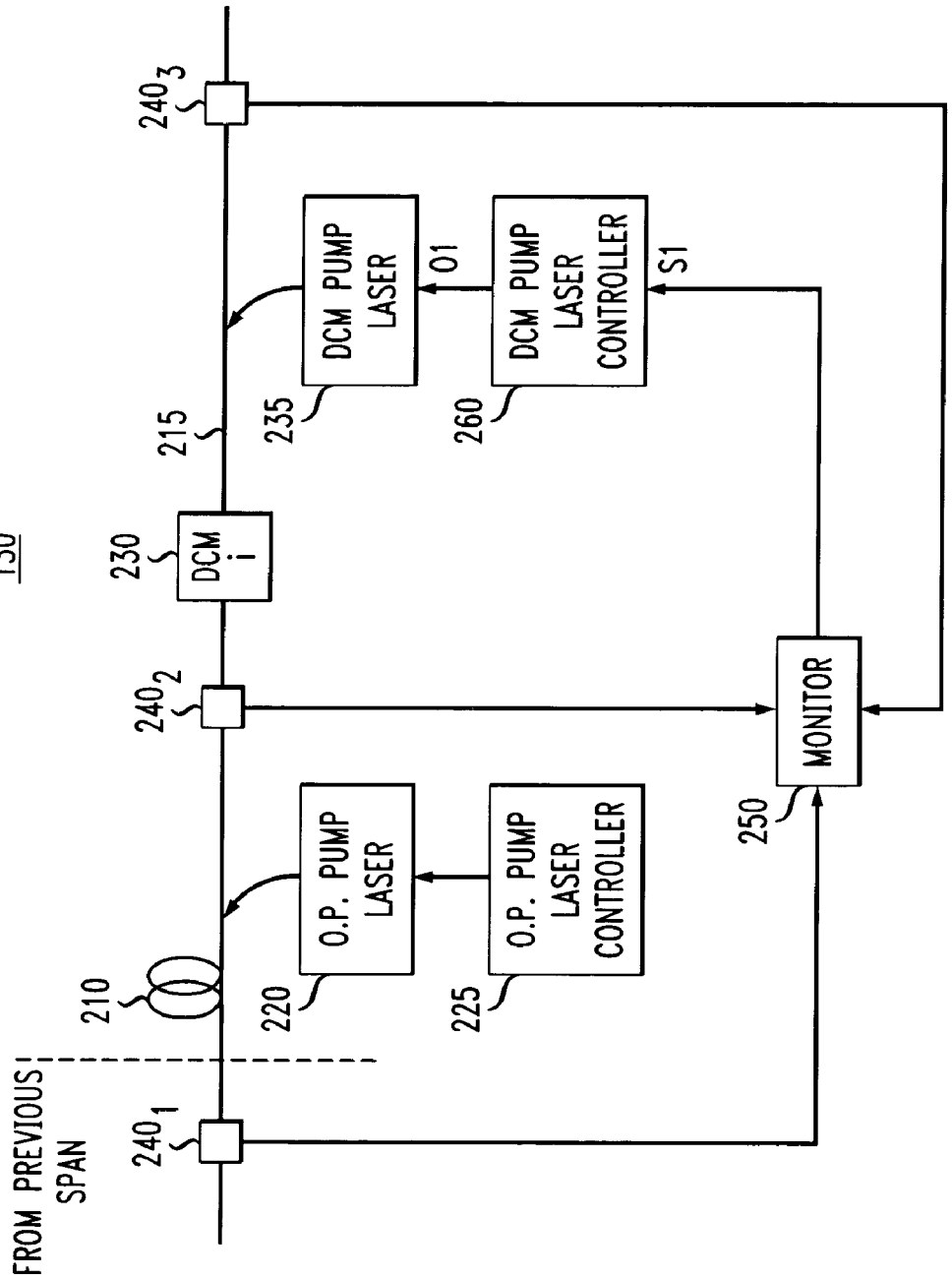
FIG. 2 depicts a high-level block diagram of a single Raman amplifier span of the Raman-amplified optical transmission system of FIG. 1 including an embodiment of the present invention.

FIG. 2 depicts a high-level block diagram of a single Raman amplifier span 130 of the Raman-amplified optical transmission system 100 of FIG. 1, including an embodiment of the present invention. The Raman amplifier span 130 of FIG. 2 comprises an amplification fiber (illustratively a 100 km outside plant fiber (corresponding to the amplification fiber span 140 of FIG. 1)) 210, a transmission fiber 215, a pump (illustratively an outside plant pump laser) 220, a pump controller (illustratively an outside plant pump laser controller) 225, a dispersion compensating module (DCM) 230, a DCM pump laser 235, three taps 240₁, 240₂, 240₃ (collectively taps 240), a monitor 250, and a DCM pump laser controller 260. In the illustrative embodiment of the present invention in FIG. 2, the tap 240₁, although depicted as being located within the Raman amplifier span 130, is actually located at the end of a directly previous Raman amplifier span and is equivalent to the tap 240₃ in the illustrated Raman amplifier span 130 of FIG. 2. As such, it should be understood that the tap 240₁ is being depicted in FIG. 2 for ease of understanding. In the Raman amplifier span 130, the tap 240₁ is positioned on a transmission fiber prior to the outside plant fiber 210 (i.e., in a previous span). The tap 240₂ is located after the outside plant fiber 210 and before the DCM 230. The tap 240₃ is located after the DMC 230.

Figure 3:
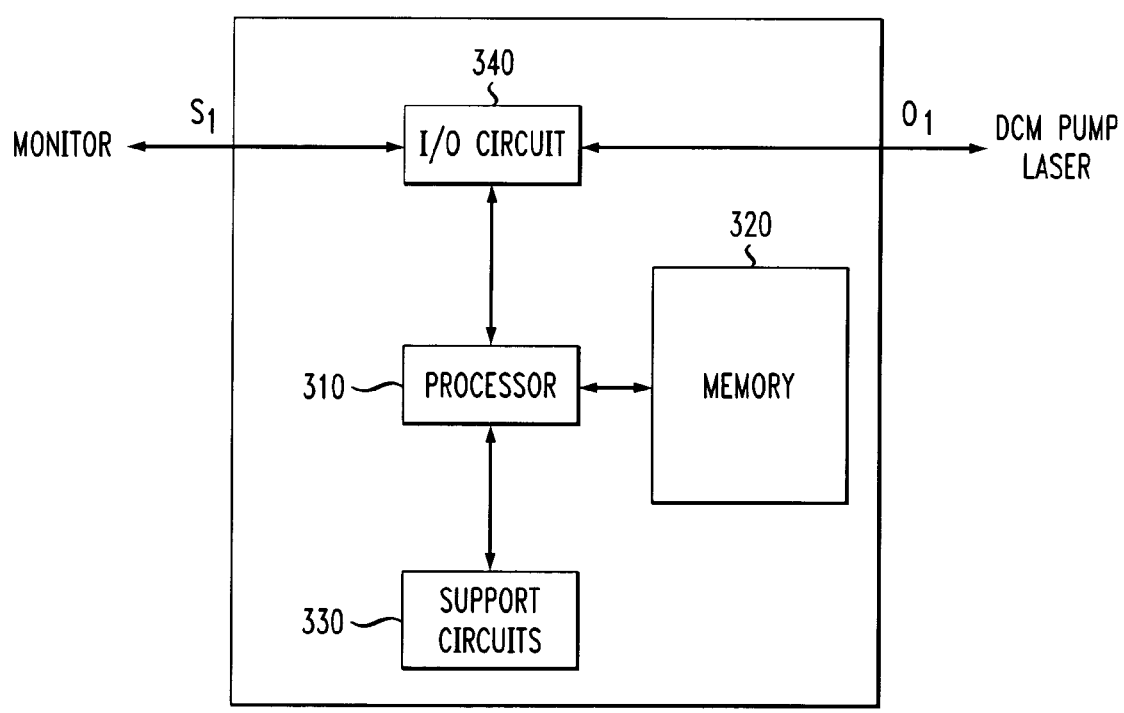
FIG. 3 depicts an embodiment of a DCM pump laser controller suitable for use in the single Raman amplifier span of FIG. 2.

FIG. 3 depicts an embodiment of a DCM pump laser controller 260 suitable for use in the single Raman amplifier span 130 of FIG. 2. The DCM pump laser controller 260 of FIG. 3 comprises a processor 310 as well as a memory 320 for storing the algorithms and control programs. The processor 310 cooperates with conventional support circuitry 330 such as power supplies, clock circuits, cache memory and the like as well as circuits that assist in executing the software routines stored in the memory 320. As such, it is contemplated that some of the process steps discussed herein as software processes may be implemented within hardware, for example, as circuitry that cooperates with the processor 310 to perform various steps. DCM pump laser controller 260 also contains input-output circuitry 340 that forms an interface between the various functional elements communicating with the DCM pump laser controller 260. For example, in the embodiment of FIG. 2, the DCM pump laser controller 260 communicates with the monitor 250 via a signal path S1 and to DCM pump laser 235 via signal path O1.

Although the DCM pump laser controller 260 of FIG. 3 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, firmware, hardware, or a combination thereof.

Referring back to FIG. 2, a signal entering the Raman amplifier span 130 was tapped (i.e., in a previous span) by the tap 240₁. The signal from the tap 240₁ is communicated to the monitor 250, wherein the power of the incoming signal is measured. The power measurement of the incoming signal is then fed-forward to and recorded in the DCM pump laser controller 260. The signal then propagates through the outside plant fiber 210 wherein the signal is amplified by the outside plant pump laser 220. The signal from the outside plant fiber 210 is tapped by the tap 240₂. The signal from the tap 240₂ is communicated to the monitor 250, wherein the power of the signal is measured. The power measurement of the signal is then fed-forward to and recorded in the DCM pump laser controller 260.

The power measurement of the tap 240₁ (located in the previous span and communicated to this span by conventional means) is compared to the power measurement of the tap 240₂ in the DCM pump laser controller 260 to determine the gain experienced by the signal in the outside plant fiber 210. The determined gain is compared to an expected amplification gain for the outside plant fiber 210 stored within the DCM pump laser controller 260 to determine a change in the gain of the outside plant fiber 210 (if any) caused by a loss or addition of a channel(s) in the Raman-amplified optical transmission system 100.

Optionally, the gain change of the outside plant fiber 210 can be determined by measuring the power of the signal entering the DCM 230 (i.e., via the tap 240₂) and comparing the power of the measured input signal to an expected power for a signal entering the DCM 230 stored in the DCM pump laser controller 260. The DCM pump laser controller 260 can then estimate the gain that the input signal would experience in the outside plant 210. The estimated gain is then compared to an expected amplification gain for the outside plant fiber 210 stored within the DCM pump laser controller 260 to determine a change in the gain of the outside plant fiber 210 (if any) caused by a loss or addition of a channel(s) in the Raman-amplified optical transmission system 100.

The gain in the outside plant fiber 210 is determined periodically to check for a gain change. It will be appreciated by those skilled in the art that the time interval for checking for a gain change in the outside plant fiber 210 is system dependent and can be set to any interval desired by a user, within system capabilities.

The signal from the outside plant fiber 210 then propagates through the DCM 230, where it is amplified by the DCM pump laser 260. Any gain change in the DCM 230 caused by the loss or addition of a channel(s) in the Raman-amplified optical transmission system 100 can be estimated by measuring the power of the propagating signal entering the DCM 130 (i.e., via the tap $240_2$) and comparing the power of the measured propagating signal to an expected power for an input signal to the DCM 230 stored in the DCM pump laser controller 260. Optionally, the gain of the DCM 230 can be calculated by comparing the power measurement of the tap $240_2$ to the power measurement of the tap $240_3$ as described below.

After propagating through the DCM 230, the output signal propagates through the transmission fiber 215 and is tapped by the tap $240_3$. The signal from the tap $240_3$ is communicated to the monitor 250 wherein the power of the output signal is measured. The power measurement of the output signal is then fed-forward to and recorded in the DCM pump laser controller 260. The power measurement of the tap $240_2$ is compared to the power measurement of the tap $240_3$ to determine the gain experienced by the signal in the DCM 230. The determined amplification gain is compared to an expected amplification gain for the DCM 230 stored within the DCM pump laser controller 260 to calculate a gain change (if any) of the DCM 230 caused by the loss or addition of a channel(s) in the Raman-amplified optical transmission system 100. Additionally, the signal from the tap $240_3$ can be used to measure the delay in the DCM 230 for other system implementations that require information regarding the delay of the DCM 230. The transmission fiber 215 is primarily used to couple the output signal from the DCM 230 to an amplification fiber (outside plant fiber) in a next Raman amplifier span.

In accordance with the present invention, the desired result in each Raman amplifier span of the Raman-amplified optical transmission system 100 is that the power of an input signal coming into the span is equal to the power of the output signal exiting the span. That is, the gains and the losses of the particular Raman amplifier span are balanced. The desired result is depicted, implementing the power measurements of the taps 240, in equation (2), which follows:

$$\frac{P(\lambda_i, \text{tap } 240_3)}{P(\lambda_i, \text{tap } 240_1)} = 1. \tag{2}$$

Characterizing the above equation as two separate gain components implementing the power measurements of all three of the taps 240 in the Raman amplifier span 130 of FIG. 2, equation (3) and equation (4) are written as follows:

$$\frac{P(\lambda_i, \text{tap } 240_2)}{P(\lambda_i, \text{tap } 240_1)} = g_{1i} \tag{3}$$

$$\frac{P(\lambda_i, \text{tap } 240_3)}{P(\lambda_i, \text{tap } 240_2)} = g_{2i} \tag{4}$$

wherein $g_{1i}$ represents the gains or losses in the outside plant fiber 210 and $g_{2i}$ represents the gains or losses in the DCM 230. As such, the product of $g_{1i}$ and $g_{2i}$ should equal one ($g_{1i}*g_{2i}=1$) for all wavelengths.

In one embodiment of the present invention, after a change in the gain of the outside plant fiber 210 is detected, an adjustment to the pump power of the outside plant pump laser 220 is made to alter the gain of the outside plant fiber 210 to correct for a gain change in the outside plant fiber 210 due to the loss or addition of channels (transient event) in the Raman-amplified optical transmission system 100. Additionally, an adjustment to the pump power of the DCM pump laser 235 is made to alter the gain in the DCM 230 to correct for a time delay associated with adjusting the pump power of the outside plant pump laser 220 to alter the gain of the outside plant fiber 210 and to correct for a gain change in the DCM 230 due to the loss or addition of channels (transient event) in the Raman-amplified optical transmission system 100. The delay associated with adjusting the power of the outside plant pump laser 220 to alter the gain in the outside plant fiber 210 is attributed to the amount of time that it takes the photons traveling from the outside plant pump laser 220 to propagate through the outside plant fiber 210 before achieving the desired (altered) gain.

Figure 4:
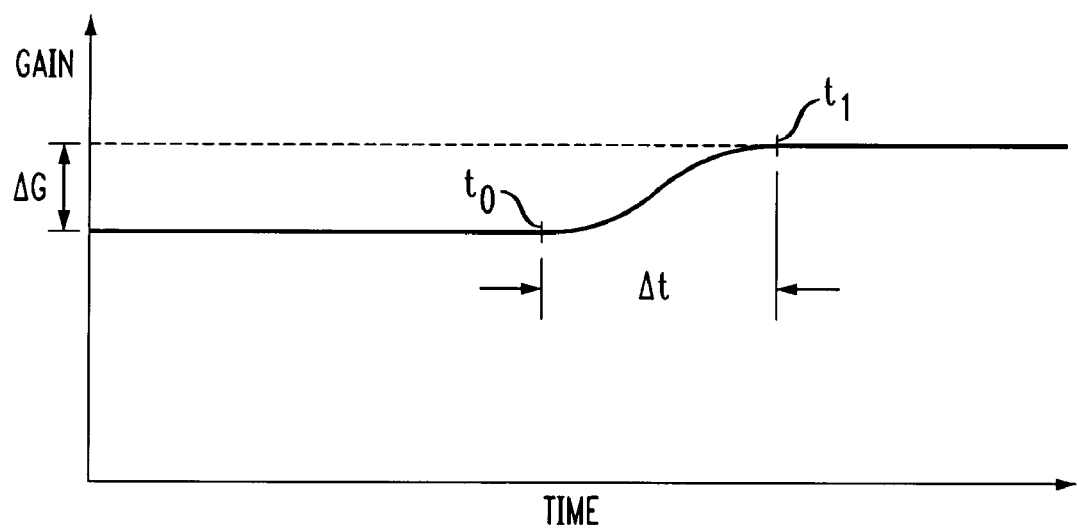
FIG. 4 graphically depicts an exemplary function of a delay associated with a gain change in an amplification fiber resulting from the adjustment of the power of a Raman pump laser.

FIG. 4 graphically depicts an exemplary function of a time delay associated with a gain change in the outside plant fiber 210 resulting from the adjustment of the power of the outside plant pump laser 220. In FIG. 4, $t_o$ depicts the point in time that the outside plant pump laser 220 was adjusted; $t_1$ depicts the point in time that the desired (corrected) gain in the outside plant fiber 210 is achieved; and $\Delta t$ depicts the amount of time between the adjustment of the outside plant pump laser 220 and when the desired gain is achieved in the outside plant fiber 210. A delay time $\Delta t$ is dependent upon the effective length of an amplification fiber and can be calculated from equation (5), which follows:

$$\Delta t = \frac{L_{\mathit{eff}} \times n(\lambda p)}{c} \tag{5}$$

wherein $n(\lambda p)$ is the refractive index of the fiber at the corresponding Raman pump wavelength, c is the speed of light in a vacuum, and $L_{\mathit{eff}}$ is the effective length of the amplification fiber. Equation (5) above is merely a rearrangement of the Rate×Time=Distance formula.

In addition, the effective length $L_{\mathit{eff}}$ of a fiber can be calculated using equation (6), which follows:

$$L_{\mathit{eff}} = \frac{1}{\alpha}[1 - \exp(-\alpha L)]. \tag{6}$$

In equation (6) above, $\alpha$ represents the attenuation of the fiber and L represents the actual length of the fiber.

In the single Raman amplifier span 130 of FIG. 2, a typical communications grade fiber was used (i.e., a SMF, TrueWave, LEAF fiber) as the outside plant fiber 210. The length of the outside plant fiber 210 is typically 100 km and the attenuation for such typical fibers is approximately 0.21 dB/km. Inputting these values for the attenuation and the actual length, respectively, in the equation (6) above, the effective length $L_{eff}$ of the outside plant fiber 210 is calculated as 20 km. Inputting this value for the effective length $L_{eff}$ in the equation (5) above, the delay time $\Delta t_{op}$ for the outside plant fiber 210 is calculated as $10^{-4}$ seconds or 100 $\mu$s. The delay time $\Delta t_{op}$ is calculated by and recorded in the DCM pump laser controller 260.

As such, the gain change in the outside plant fiber 210 due to an adjustment of the pump power of the outside plant pump laser 220 must be considered as a function of time. This change in gain as a function of time (shape from $t_0$ to $t_1$ in FIG. 4) is calculable (as described above) from the determined delay time $\Delta t_{op}$ associated with the outside plant fiber 210 and the determined gain change (described above) in the outside plant fiber 210. This function (shape from $t_0$ to $t_1$) is considered by the inventors as $f_1(t)$. The function $f_1(t)$ is determined by and recorded in the DCM pump laser controller 260. That is, the parameters for the outside plant, fiber 210, such as the values for the actual length and attenuation of the outside plant fiber, 210, are stored in the DCM pump laser controller 260. Utilizing equations (5) and (6) above, the DCM pump laser controller 260 then calculates the delay time $\Delta t_{op}$ for the outside plant fiber 210. The DCM pump laser controller 260 then awaits for information from the tap $240_2$, to determine the amount of gain change in the outside plant fiber 210, to calculate the function $f_1(t)$. The value of the delay function $f_1(t)$ is stored in the DCM pump laser controller 260.

As described above, an adjustment to the pump power of the DCM pump laser 235 is made to change the gain in the DCM 230 to compensate for $f_1(t)$ and to correct for a gain change in the DCM 230 due to the loss or addition of a channel(s) (transient event) in the Raman-amplified optical transmission system 100. As previously disclosed, the gain change in the DCM 230 can be estimated by measuring the power of the propagating signal entering the DCM 130 (i.e., via the tap $240_2$) and comparing the power of the measured propagating signal to an expected power for an input signal to the DCM 230 stored in the DCM pump laser controller 260. This gain change in the DCM 230, due to the loss or addition of channels in the Raman-amplified optical transmission system 100, is considered by the inventors as $\Delta g_{2DCM}$.

As such, the DCM pump laser controller 260 needs to calculate a function $f_3(t)$ to correct for $f_1(t)$ and $\Delta g_{2DCM}$, such that $f_3(t)$ is utilized by the DCM pump laser controller 260 to adjust the power of the DCM pump laser 235 to alter the gain in the DCM 230. Similar to the case of the outside plant fiber 210 above, though, adjusting the pump power of the DCM pump laser 235 does not instantaneously change the gain in the DCM 230 to the desired gain. As such, a delay time associated with adjusting the power of the DCM pump laser 235 to alter the gain of the DCM 230 to correct for the gain change $\Delta g_{2DCM}$ in the DCM 230 must also be considered.

A DCM typically has a much shorter fiber length than an amplification fiber in a transmission system. For example, the DCM 230 of FIG. 2 has a much shorter overall actual length than the outside plant fiber 210. The length of the DCM 230 used in the in the Raman amplifier span 130 of FIG. 2 is, in this case 10 km, but varies with the length of the outside plant fiber 210. As such, a delay associated with changing the pump power of the DCM pump laser 235 to compensate for a change in gain in the DCM 230 due to the loss or addition of a channel(s) in the Raman-amplified optical transmission system 100 will be significantly shorter. For example, inputting the actual length L of the DCM 130 into the equation (6) above, the effective length $L_{eff}$ of the DCM 130 is calculated to be 3 km. To calculate for a delay time $\Delta t_{DCM}$ associated with adjusting the pump power of the DCM pump laser 235 to change the gain in the DCM 230, the determined effective length $L_{eff}$ is input into the equation (5) above. Inputting 3 km for the effective length $L_{eff}$ of the DCM 230 in the equation (5) above, the delay time $\Delta t_{DCM}$ associated with adjusting the pump power of the DCM pump laser 235 to change the gain in the DCM 230 is calculated to be 15 $\mu$s. Knowing the delay time $\Delta t_{DCM}$ and the amount of gain change $\Delta g_{2DCM}$ in the DCM 230, a delay function is calculated to represent the delay time associated with adjusting the pump power of the DCM pump laser 235 to change the gain in the DCM 230. This function is considered by the inventors as $f_2(t)$. The value of $f_2(t)$ is stored in the DCM pump laser controller 260.

Because $f_1(t)$, $\Delta g_{2DCM}$ and $f_2(t)$ can be modeled based on measurements of a propagating signal taken at the tap $240_1$ (from the previous span) and the tap $240_2$ and because the signal from the tap $240_2$ is fed-forward to the DCM pump laser controller 260, $f_1(t)$, $\Delta g_{2DCM}$ and $f_2(t)$ are determined so the correction can be performed at the DCM 230. That is, there is time for the DCM pump laser controller 260 to determine a function $f_3(t)$ to correct for $f_1(t)$, $\Delta g_{2DCM}$ and $f_2(t)$ because the information from the tap $240_2$ is fed-forward to the DCM pump laser controller 260.

Recalling that the product of $g_{1i}$ and $g_{2i}$ should equal one ($g_{1i}*g_{2i}=1$) for all wavelengths, the function $f_3(t)$ is calculated by the DCM pump laser controller 260 using equation (7), as follows:

$$[g_{1i}+f_1(t)][g_{2i}+\Delta g_{2DCM}+f_2(t)+f_3(t)]= 1 \qquad (7)$$

where $g_{1i}$ and $g_{2i}$ are the original gains of the outside plant fiber 210 and the DCM 230, respectively (before any transient event), $f_1(t)$ is the delay function associated with an adjustment of the power of the outside plant pump laser 220 to alter the gain of the outside plant fiber 210, $\Delta g_{2DCM}$ is the gain change in the DCM 230 due to the loss or addition of a channel(s) (transient event) in the Raman-amplified optical transmission system 100, $f_2(t)$ is the delay function associated with an adjustment of the power of the DCM pump laser 235 to alter the gain of the DCM 230, and $f_3(t)$ is a function to be calculated by the DCM pump laser controller 260 to adjust the power of the DCM pump laser 235 to adjust the gain in the DCM 230 to correct for the functions $f_1(t)$ and $f_2(t)$, and to compensate for the gain change $\Delta g_{2DCM}$ in the DCM 230 due to the loss or addition of a channel(s) in the Raman-amplified optical transmission system 100. Solving for $f_3(t)$:

$$f_3(t) = \frac{1}{g_{1i}+f_1(t)} - g_{2i} - \Delta g_{2DCM} - f_2(t). \qquad (8)$$

The function $f_3(t)$ is calculated by the DCM pump laser controller 260 to adjust the pump power of the DCM pump laser 235 to alter the gain in the DCM 230 to compensate for $f_1(t)$ and $f_2(t)$, and to compensate for the gain change $\Delta g_{2DCM}$ in the DCM 230 due to a loss or addition of a channel(s) in the Raman-amplified optical transmission system 100.

Although the single Raman amplifier span 130 of the Raman-amplified optical transmission system 100 of FIG. 1 was depicted as comprising a single amplification fiber, it will be appreciated by those skilled in the art that the methods of the present invention can be implemented in Raman-amplified optical transmission systems comprising amplification spans comprising a plurality of amplification fibers and other amplification mediums in a single span.

In an alternate embodiment of the present invention, a gain change in the outside plant fiber 210 and in the DCM 230 due to the loss or addition of a channel(s) in the Raman-amplified optical transmission system 100 is compensated by adjusting only the pump power of the DCM pump laser 235 to alter the gain in the DCM 230.

As described above for the first embodiment, because adjusting the pump power of the DCM pump laser 235 does not instantaneously change the gain in the DCM 230 to a desired gain, the change in gain in the DCM 230 due to an adjustment of the pump power of the DCM pump laser 235 must again be considered as a function of time. Referring to FIG. 2, because the properties of the DCM 230 do not change, the delay time $\Delta t_{DCM}$ associated with the adjustment of the DCM pump laser 235 to alter the gain in the DCM 230 remains the same (15 $\mu$s). Again, a delay associated with adjusting the pump power of the DCM pump laser 235 to alter the gain in the DCM 230 is attributed to the amount of time that it takes the photons traveling from the DCM pump laser 235 to propagate through the DCM 230 before achieving the desired (corrected) gain. Knowing the amount of gain change desired in the DCM 230 to correct for a gain change in the outside plant fiber 210 and the DCM 230 due to a loss or addition of a channel(s) in the Raman-amplified optical transmission system 100, a delay function $f_4(t)$ can be calculated to account for the delay time $\Delta t_{DCM}$ associated with the adjustment of the DCM pump laser 235 to alter the gain in the DCM 230 to correct for a gain change in the outside plant fiber 210 and the DCM 230. Because the signals from the tap 240$_2$ is fed-forward to the DCM pump laser controller 260, the amount of gain change required in the DCM 230 to correct for a gain change in the outside plant fiber 210 and the DCM 230 due to a loss or addition of a channel(s) in the Raman-amplified optical transmission system 100 is known by the DCM 230. As such, the delay function $f_4(t)$ can be modeled based on the measurements of a propagating signal taken at the taps 240$_1$ and 240$_2$ and calculated by the DCM laser controller 260 before the propagating signal reaches the DCM 230.

In addition to correcting for $f_4(t)$, the DCM 230 must also correct for a gain change $\Delta g_{2OP}$ in the outside plant fiber 210 and a gain change $\Delta g_{2DCM}$ in the DCM 230 due to a loss or addition of a channel(s) in the Raman-amplified optical transmission system 100. As such, a function $f_5(t)$ is calculated by the DCM pump laser controller 260 to correct for the delay function $f_4(t)$ and to correct for both, the gain change $\Delta g_{2OP}$ in the outside plant fiber 210 and the gain change $\Delta g_{2DCM}$ in the DCM 230 due to the loss or addition of channels in the Raman-amplified optical transmission system 100. Because $f_5(t)$ can be modeled based on measurements of a propagating signal taken at the taps 240$_1$ (from the previous span) and 240$_2$ and because the signals from the tap 240$_2$ is fed-forward to the DCM pump laser controller 260, the correction function $f_5(t)$ is determined so a correction can be performed at the DCM 230. Recalling that the product of $g_{1i}$ and $g_{2i}$ should equal one ($g_{1i}*g_2=1$) for all wavelengths, the function $f_5(t)$ is determined by the DCM pump laser controller 260 as follows:

$$[g_{1i}+\Delta g_{2OP}][g_{2i}+\Delta g_{2DCM}+f_4(t)+f_5(t)]=1 \quad (9)$$

where $g_{1i}$ and $g_{2i}$ are the original gains of the outside plant fiber 210 and the DCM 230, respectively, $\Delta g_{2OP}$ and $\Delta g_{2DCM}$ are the gain changes in the outside plant fiber 210 and the DCM 230, respectively, due to the loss or addition of a channel(s) (transient event) in the Raman-amplified optical transmission system 100, $f_4(t)$ is the delay function associated with an adjustment of the power of the DCM pump laser 235 to alter the gain of the DCM 230, and $f_5(t)$ is a function to be calculated and utilized by the DCM pump laser controller 260 to adjust the power of the DCM pump laser 235 to alter the gain in the DCM 230 to correct for the gain changes in the outside plant fiber 210 and the DCM 230 caused by the loss or addition of a channel(s) in the Raman-amplified optical transmission system 100 while accounting for the delay function $f_4(t)$ associated with an adjustment of the power of the DCM pump laser 235 to alter the gain of the DCM 230. Solving for $f_5(t)$:

$$f_5(t) = \frac{1}{g_{1i}+\Delta g_{2OP}} - g_{2i} - \Delta g_{2DCM} - f_4(t). \quad (10)$$

Again, the function $f_5(t)$ is calculated and utilized by the DCM pump laser controller 260 to adjust the pump power of the DCM pump laser 235 to alter the gain in the DCM 230 to correct for the gain changes in the outside plant fiber 210 and the DCM 230 caused by the loss or addition of a channel(s) in the Raman-amplified optical transmission system 100 while accounting for the delay function $f_4(t)$ associated with an adjustment of the power of the DCM pump laser 235 to alter the gain of the DCM 230.

Figure 5:
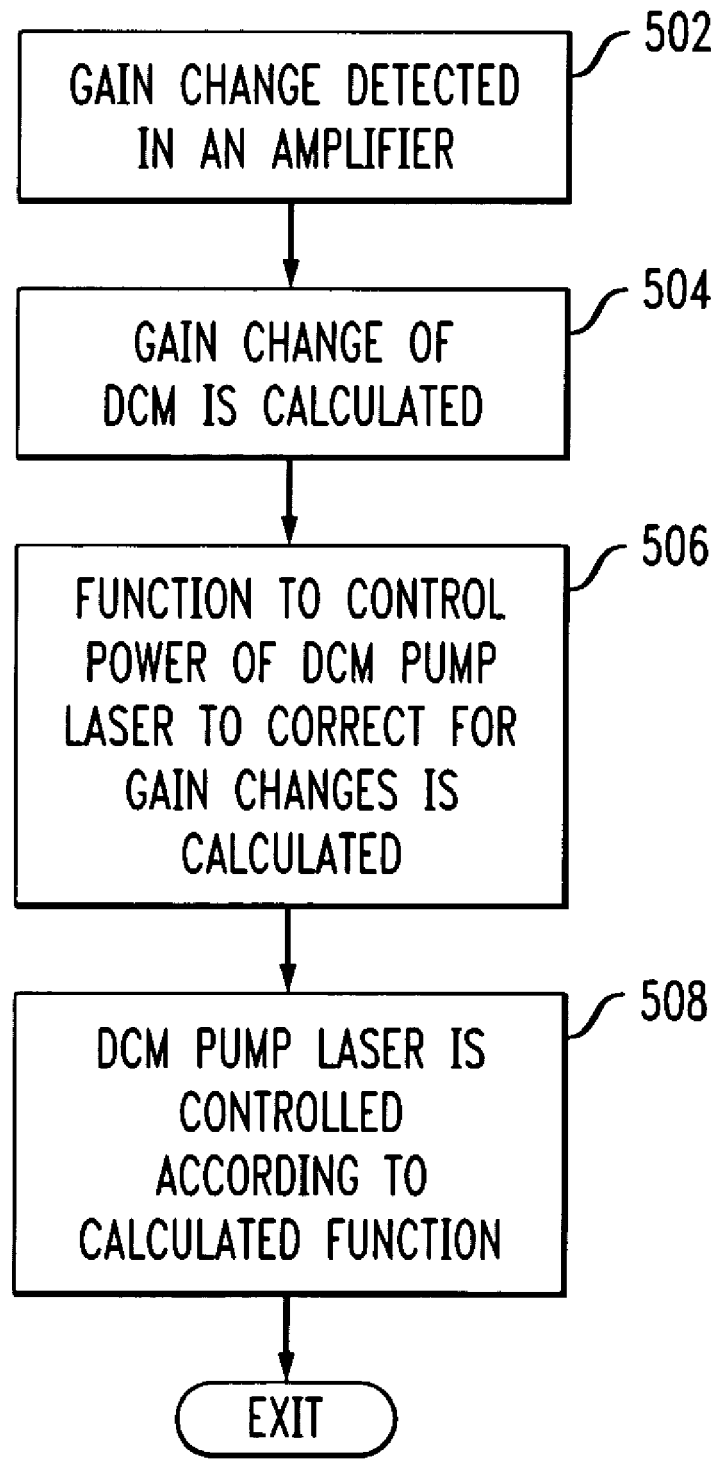
FIG. 5 depicts a flow diagram of an embodiment of a method of the present invention.

FIG. 5 depicts a flow diagram of an embodiment of a method 500 of the present invention. The method 500 is entered at step 502 when a gain change is detected in an amplifier of an amplification span of a Raman-amplified optical transmission system. For example, the power of a propagating signal in an amplification span is measured after an outside plant fiber by a monitor. Information of the measured signal powers of the propagating signal is communicated to a DCM pump laser controller. The DCM pump laser controller calculates the gain in the outside plant fiber and compares the calculated gain to a stored expected gain for the outside plant fiber to determine a gain change in the outside plant fiber. The method 500 then proceeds to step 504.

At step 504, the method 500 calculates a gain change in a DCM. For example, the gain change in the DCM 230 can be estimated by measuring the power of the propagating signal entering the DCM 130 (i.e., via the tap 240$_2$) and comparing the power of the measured propagating signal to an expected power for an input signal to the DCM 230 stored in the DCM pump laser controller 260. The method 500 then proceeds to step 506.

At step 506, the method 500 calculates a function to control the pump power of a DCM pump laser to compensate for the detected gain changes of step 502 and step 504. For example, the DCM pump laser controller may use the measured signal power information to calculate the appropriate pump power for the DCM pump laser as described in connection with equations 1–10. The DCM pump laser controller may use feed-forward control techniques, feedback control techniques, hybrid control techniques, or any other suitable control techniques to calculate the pump power for the DCM pump laser.

At step 508, the method 500 controls the DCM pump according to the function calculated at step 506. For example, the DCM pump laser controller adjusts the power of the DCM pump laser to the values calculated in step 506. The method 500 is then exited.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method, comprising:
in response to a detection of a power transient in an optical signal in a Raman-amplified optical transmission system, varying a gain of at least one dispersion compensating module (DCM) to correct for a change in signal power, wherein said detection of a power transient comprises:
receiving an indication of a power level of the optical signal proximate the output of a previous span; and
comparing the power level of said received indication to a stored expected power level for the optical signal.

2. The method of claim 1, wherein the gain of said at least one DCM is varied by adjusting the power of at least one corresponding DCM pump.

3. The method of claim 2, wherein the power of said at least one corresponding DCM pump is adjusted by a corresponding DCM pump controller.

4. The method of claim 1, wherein said change in signal power comprises:
a gain change in an amplification fiber of said Raman-amplified optical transmission system;
a gain change in said at least one DCM; and
a delay function associated with the varying of the gain of said at least one DCM.

5. The method of claim 4, wherein a function f(t) for varying the gain of said at least one DCM is determined using the equation:

$$f(t) = \frac{1}{g_{1i} + \Delta g_{2OP}} - g_{2i} - \Delta g_{2DCM} - f_1(t),$$

wherein $g_{1i}$ is a gain in said amplification fiber prior to the power transient, $g_{2i}$ is a gain in said at least one DCM prior to the power transient, $\Delta g_{2OP}$ is said gain change in said amplification fiber due to the power transient, $\Delta g_{2DCM}$ is said gain change in said DCM due to the power transient, and $f_1(t)$ is the delay function associated with the varying of the gain of said at least one DCM.

6. The method of claim 1, wherein the gain of said at least one DCM is varied to further correct for a delay associated with varying a gain in an amplification fiber of said Raman-amplified optical transmission system.

7. The method of claim 6, wherein the change in signal power comprises;
a gain change in said amplification fiber of said Raman-amplified optical transmission system;
a gain change in said at least one DCM;
a delay function associated with the varying of the gain of said at least one DCM; and
a delay function associated with the varying of the gain of said amplification fiber.

8. The method of claim 7, wherein a function f(t) for varying the gain of said at least one DCM is determined using the equation:

$$f(t) = \frac{1}{g_{1i} + f_1(t)} - g_{2i} - \Delta g_{2DCM} - f_2(t),$$

wherein $g_{1i}$ is a gain in said amplification fiber prior to the power transient, $g_{2i}$ is a gain of said at least one DCM prior to the power transient, $f_1(t)$ is the delay function associated with the varying of the gain of said amplification fiber, $\Delta g_{2DCM}$ is the gain change in said at least one DCM due to the power transient, and $f_2(t)$ is the delay function associated with the varying of the gain of said at least one DCM.

9. The method of claim 1, wherein said Raman-amplified optical transmission system comprises a plurality of amplification fibers and wherein, in response to the detection of a power transient, the gain of said at least one DCM is varied to correct for a cumulative change in signal power.

10. The method of claim 1, wherein said Raman-amplified optical transmission system comprises a plurality of optical spans, each optical span comprising at least one DCM, and wherein in response to the detection of a power transient in an optical span, the gain of the at least one DCM in said optical span is varied to correct for a change in signal power in said optical span.

11. The method of claim 1, wherein the expected power level for said optical signal is stored in a DCM pump controller.

12. The method of claim 1, wherein indication regarding said change in signal power is fed forward to a DMC pump controller for varying the gain of said at least one DCM.

13. A method, comprising:
in response to a detection of a power transient in an optical signal in a Raman-amplified optical transmission system, varying a gain of at least one dispersion compensating module (DCM) to correct for a change in signal power, wherein said detection of a power transient comprises:
measuring the power level of the optical signal before and after an amplification fiber of said Raman-amplified optical transmission system;
calculating the gain of said amplification fiber using the measured power levels; and
comparing the calculated gain to a stored expected gain for said amplification fiber.

14. The method of claim 13, wherein the expected gain for said amplification fiber is stored in a DCM pump controller.

15. An apparatus comprising a memory for storing program instructions and a processor for executing said instructions to configure the apparatus to perform the step of:
in response to a detection of a power transient in an optical signal in a Raman-amplified optical transmission system, varying again of at least one dispersion compensating module (DCM) to correct for a change in signal power, wherein said detection of a power transient comprises:
receiving an indication of a power level of the optical signal proximate the output of a previous span; and
comparing the power level of said received indication to a stored expected power level for the optical signal.

16. An apparatus, comprising:
a means for detecting a power transient in an optical signal in a Raman-amplified optical transmission system, wherein the power transient is indicative of a change in signal power corresponding to a transient event, said means for detecting comprises:
  means for receiving an indication of a power level of the optical signal proximate the output of a previous span; and
  means for comparing the power level of said received indication to a stored expected power level for the optical signal; and
a means for varying the gain of at least one dispersion compensating module (DCM) in said Raman-amplified optical transmission system to correct for said change in signal power.

17. A Raman-amplified optical transmission system, comprising:
at least one amplification fiber, for amplifying a propagating optical signal;
at least one corresponding pump for pumping said at least one amplification fiber;
at least one monitor, for measuring the optical properties of said propagating optical signal;
at least one dispersion compensating module (DCM), for imparting a gain on said propagating optical signal
at least one corresponding DCM pump, for pumping said at least one DCM; and
at least one DCM pump controller for adjusting the power to said DCM pump, said DCM pump controller comprising a memory for staring said measured optical properties, program instructions, and a processor for executing said instructions to configure the apparatus to perform the step of:
  in response to the detection of a power transient in said optical signal, varying a gain of said at least one DCM to correct for a change in signal power.

18. The Raman-amplified optical transmission system of claim 17, wherein said amplification fiber is an erbium-doped fiber amplifier.

19. The Raman-amplified optical transmission system of claim 17, wherein said amplification fiber is standard transmission fiber.

* * * * *